United States Patent
Williams et al.

(10) Patent No.: US 8,195,811 B2
(45) Date of Patent: *Jun. 5, 2012

(54) POLICY CO-ORDINATION IN A COMMUNICATIONS NETWORK

(75) Inventors: Brian Charles Williams, Greensborough (AU); Leslie Graf, Balwyn (AU); Mark Hollis, Park Orchards (AU); Ian Rytina, Carlton (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1394 days.

This patent is subject to a terminal disclaimer.

(21) Appl. No.: 11/761,115

(22) Filed: Jun. 11, 2007

(65) Prior Publication Data

US 2011/0289226 A1    Nov. 24, 2011

Related U.S. Application Data

(63) Continuation of application No. 10/497,131, filed as application No. PCT/IB01/02796 on Nov. 28, 2001, now Pat. No. 7,246,165.

(51) Int. Cl.
*G06F 15/16* (2006.01)

(52) U.S. Cl. .................................. 709/228; 709/227
(58) Field of Classification Search .......... 709/200–203, 709/217–227, 228
See application file for complete search history.

(56) References Cited

U.S. PATENT DOCUMENTS

| | | | | |
|---|---|---|---|---|
| 6,621,793 | B2 * | 9/2003 | Widegren et al. | 370/230.1 |
| 7,027,818 | B2 * | 4/2006 | Bos et al. | 455/452.2 |
| 7,072,336 | B2 * | 7/2006 | Barany et al. | 370/389 |
| 7,246,165 | B2 * | 7/2007 | Williams et al. | 709/225 |

\* cited by examiner

*Primary Examiner* — Moustafa M Meky (57) ABSTRACT

In order to address the problem of allowing a GGSN of a UMTS core network to work towards multiple Policy Control Functions (PCFs) co-located with P-CSCF nodes using the COPS protocol, a policy control function coordinator (PCF-C) is implemented between the GGSN and the P-CSCF. A single COPS connection is established between the GGSN and the PCF-C while a COPS connection is established between the PCF-C and each of the P-CSCF nodes. Decisions made at the PCFs are routed to the GGSN via the PCF-C, and responses generated at the GGSN are routed to the appropriate PCFs via the GGSN. This architecture avoids conflicts which might otherwise arise with the COPS protocol.

14 Claims, 7 Drawing Sheets

POLICY CO-ORDINATION IN A COMMUNICATIONS NETWORK

CROSS-REFERENCE TO RELATED APPLICATIONS

The present Application is related to the subject matter of the following commonly assigned, copending U.S. patent application Ser. No. 10/497,131, entitled "Policy Co-ordination in a Communications Network". The content of the above referenced application is incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

1. Field of the Invention

The present invention relates to policy control within a communications network and in particular, though not necessarily, to policy control at a GGSN of a mobile telecommunications network.

2. Background to the Invention

The European telecommunications institute known as 3GPP is currently in the process of introducing a new set of protocols for the mobile telecommunications system known as Universal Mobile Telecommunications System (UMTS). The architecture of a UMTS network is based upon a UMTS core network and a UMTS Terrestrial Radio Access Network (UTRAN). For the transfer of data, UMTS will implement a packet switched service such as General Packet Radio Service (GPRS) or similar. In order to send and receive data, a mobile terminal or User Equipment (UE) establishes a "session" with a node in the network known as a Gateway GPRS Support Node (GGSN). The GGSN provides an interface for the UE to the outside world.

Within the core network, the GGSN enforces policies (i.e. control options) of the network operator. For example, an operator may define policies setting out which subscribers can access which data services (i.e. the blocking and unblocking of services), and allocating priorities to subscribers, e.g. at which times subscribers can connect.

To facilitate the provision of multimedia services, 3GPP has been developing a so called IP Multimedia Core Network Subsystem (IMS). The IMS communicates with the GPRS network and contains all elements that are used to provide IP based multimedia services. For a mobile to mobile call, the IMS will sit between two GPRS networks (assuming the mobiles belong to different networks). Certain nodes of the IMS may be owned by the operator of a first of the GPRS networks, with the remaining nodes being owned by the operator of the second network (some IMS nodes may be owned by a third party). The base protocol for multimedia services is the IETF Session Initiation Protocol (SIP). SIP makes it possible for a calling party to establish a session with called party (over which data may be exchanged) even though the calling party does not know the current IP address of the called party, prior to initiating the call. SIP provides other functionality including the negotiation of session parameters (e.g. Quality of Service and codecs).

The IMS comprises a Serving Call State Control Function (S-CSCF) which performs the session control services for the UE, and maintains a session state as needed by the network operator for support of services. The main function performed by the S-CSCF during a session is the routing of incoming and outgoing call set-up requests. The IMS may also comprises a Proxy CSCF (P-CSCF). The main function performed by the PCSCF is to route SIP messages between the UE and the home network. The P-CSCF communicates with the GGSN.

Figure 1:
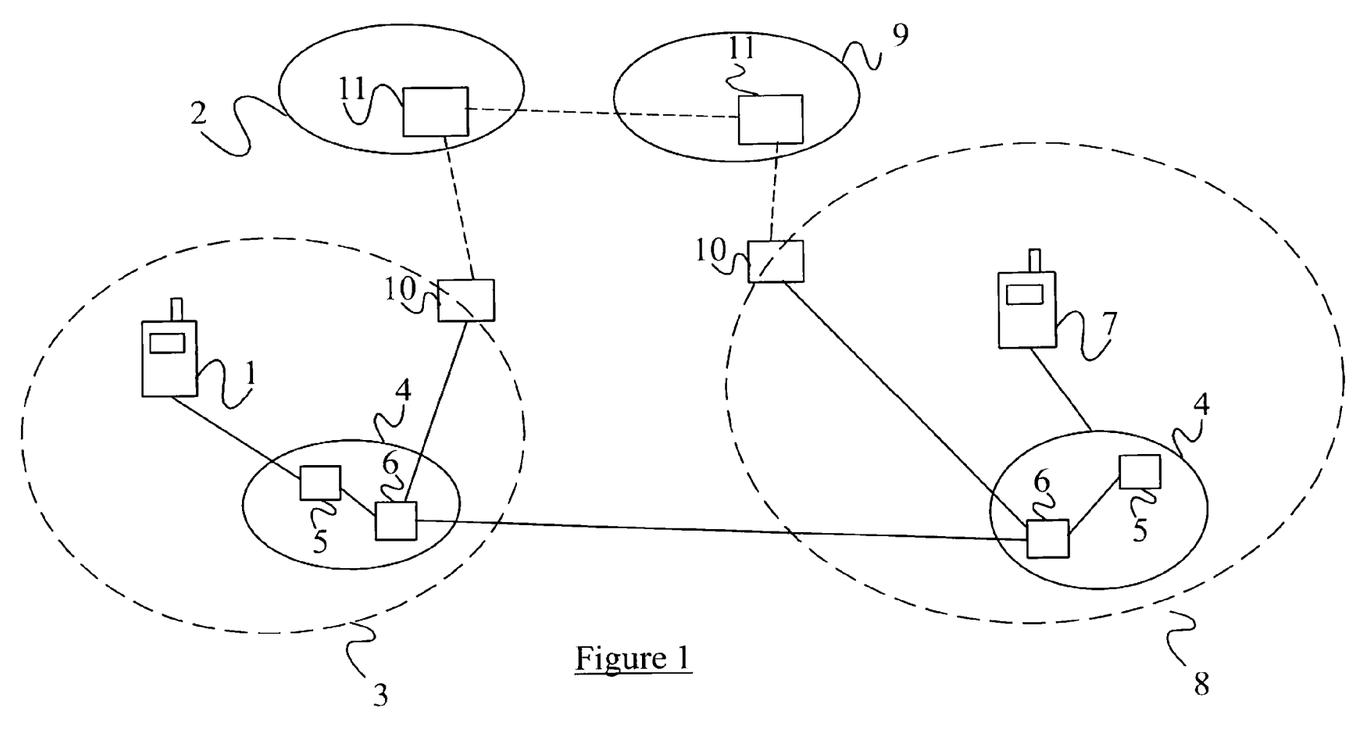
FIG. 1 illustrates schematically a communications network providing a data connection between two UEs.

FIG. 1 illustrates schematically a typical scenario where User Equipment (UE) 1 is a subscriber of a cellular telephone network 2. The subscriber using the UE 1 is identified in the network 2 by a unique subscriber identity, and the network is referred to as the subscriber's "home" network. In the scenario illustrated in FIG. 1, the UE 1 is registered with a "foreign" or visited network 3. The visited network comprises a General Packet Radio Service (GPRS) network 4 (as well as a circuit switched network which is not illustrated in FIG. 1). Within the network 4, two nodes relevant to the UE 1 can be identified. These are the Serving GPRS Support node (SGSN) 5 and the Gateway GPRS Support Node (GGSN) 6. The role of the SGSN 5 is to maintain subscription data (identities and addresses) and to track the location of the UE within the network. The role of the GGSN 6 is to maintain subscription information and allocated IP addresses and to track the SGSN to which the UE 1 is attached. The GGSN 6 is coupled to an IP network.

Typically, when the UE 1 is turned on it "attaches" itself to the GGSN and a Packet Data Protocol context is established between the UE 1 and the GGSN 6. This context provides a "pipe" for transporting data from the UE 1 to the GGSN 6. This process involves the allocation of an IP address to the UE1. Typically, the routing prefix part of the address is a routing prefix allocated to the GGSN 6.

FIG. 1 illustrates a second UE 7 which is registered with a foreign network 8 and which has as its home network a network 9. Nodes and (sub) networks within the foreign network 8 are identified with like numerals to those used within network 3. The IP Multimedia Core Network Subsystem (IMS) contains all of the elements required to provide IP based multimedia services including the setting up of sessions between the two UEs 1,7. The functionality provided by the IMS is set out in 3GPP TS 23.228. The IMS consists of a set of nodes which are coupled to an IP backbone network. Illustrated within the IMS of FIG. 1 are a Proxy Call State Control Function (P-CSCF) node 10 in each of the visited networks 3,8. and a Serving Call State Control Function (S-CSCF) node 11 in each of the home networks 2,9. In order to establish a session between the two UEs 1,7 of FIG. 1, appropriate SIP signalling is sent from the P-CSCF located in the visited network to which the initiating party is connected, to the S-CSCF located in the initiating UE's home network. This S-CSCF then contacts the S-CSCF in the home network of the called UE, which in turn contacts the P-CSCF in the visited network to which the called UE is connected. A data session can then be established between the two GGSNs 6 to which the UEs 1,7 are connected. When a UE is registered with its home network, the S-CSCF of the home network serves also as a P-CSCF for the UE.

The Internet Engineering Task Force (IETF) has specified a protocol known as Common Open Policy Service (COPS) which is a simple query and response protocol that can be used to exchange policy information (which may relate to any feature, service, etc over which it is desired to exercise control) between a policy server (Policy Decision Point or PDP) and its clients (Policy Enforcement Points or PEPs). COPS is a query/response protocol that supports two common models for policy control: Outsourcing and Configuration.

Figure 2:
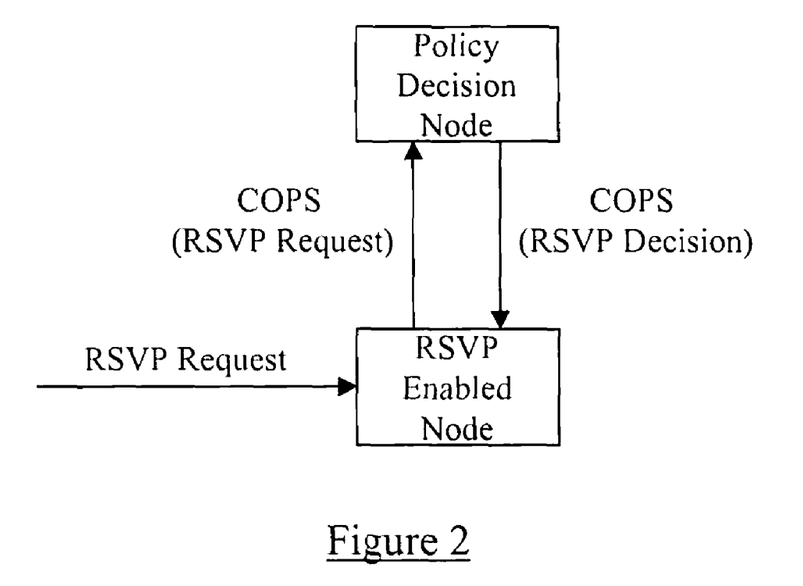
FIG. 2 illustrates schematically the COPS-RSVP model.

In the outsourcing scenario, the PEP delegates responsibility to an external policy server (PDP) to make decisions on its behalf. For example, in COPS Usage for Resource reSerVation Protocol (COPS-RSVP), when a RSVP reservation message arrives, the PEP must decide whether to admit or reject the request. It can outsource this decision by sending a specific query to its PDP and, waiting for its decision before admitting the outstanding reservation. This is illustrated in FIG. 2.

Figure 3:
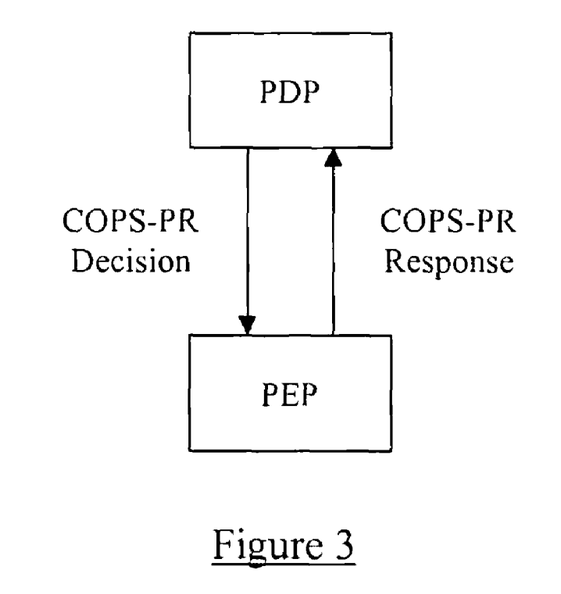
FIG. 3 illustrates schematically the COPS-PR model.

The COPS configuration model addresses the kind of events at the PEP that require an instantaneous policy decision. This variation is known as COPS for Provisioning (COPS-PR). COPS-PR is designed as a means to install policies from the decision node into the enforcement node where the policy is enacted. With this protocol, decisions are transmitted asynchronously from the decision node at anytime, and the enforcement node replies to indicate whether the policy was installed or not. This is shown in FIG. 3. The PDP may proactively configure the PEP to react in some specified manner to external events (such as user input), PEP events, and any combination thereof (N: Mcorrelation). Configuring or provisioning may be performed in bulk (e. g., entire router QoS configuration) or in portions (e. g., updating a DiffServ marking filter).

COPS-PR is a general purpose protocol, and can be used to install policies for any functions. It uses the concept of a Policy Information Base (PIB). A PIB defines the policy data. There may be one or more PIBs for a given area of policy and different areas of policy may have different sets of PIBs. This allows support for a model that includes multiple PDPs controlling non-overlapping areas of policy on a single PEP.

A "client-type" (value) is used to identify the function that is being managed by the policy control. A single client-type for a given area of policy (e. g., DiffServ) will be used for all PIBs that exist in that area. The client will treat all of the COPS-PR client types it supports as non-overlapping and independent name spaces where instances are shared. For each client type which the PEP supports, the PEP can only work towards a single PDP.

Figure 4:
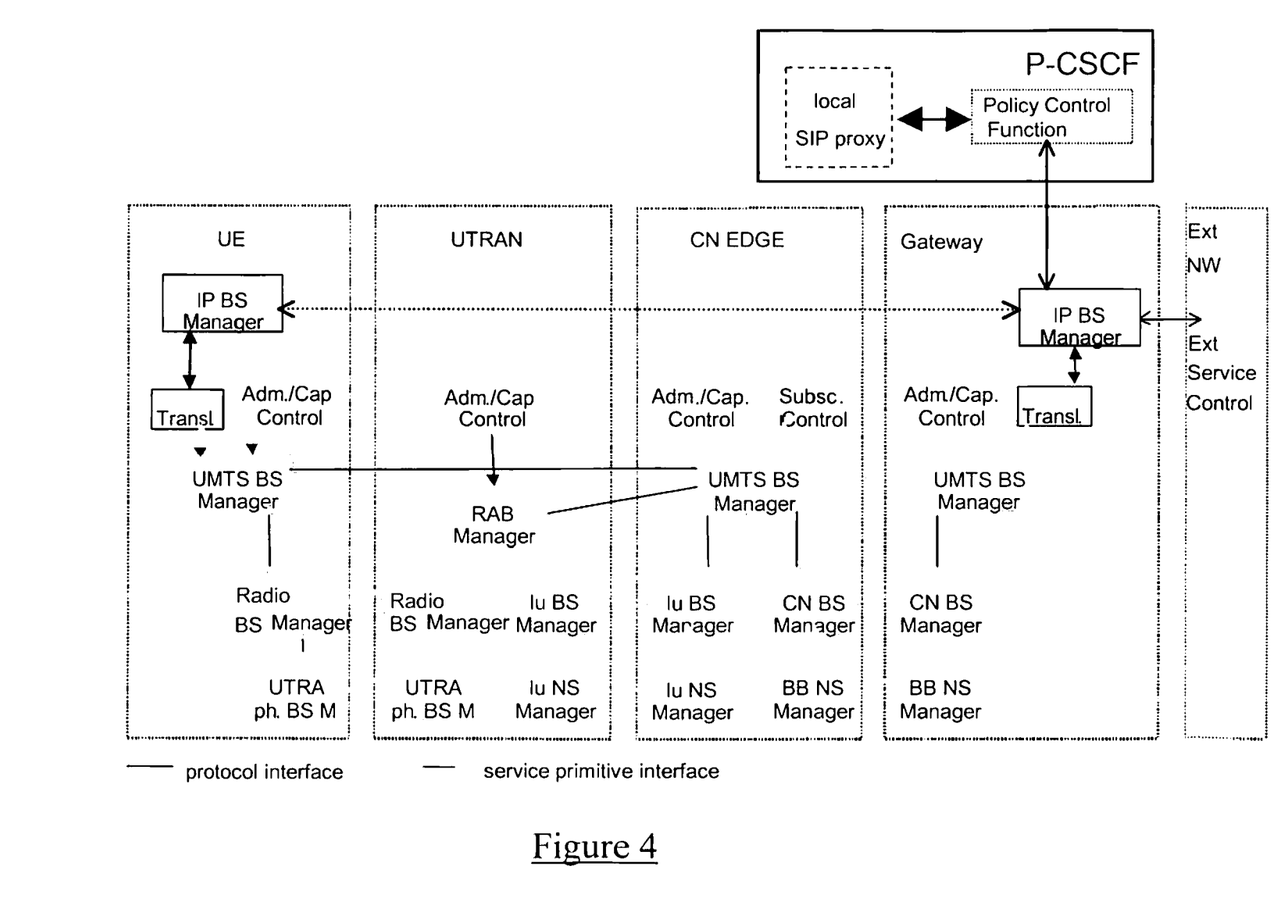
FIG. 4 illustrates the 3GPP architecture for QoS management functions.

3GPP has developed a mechanism for allowing the P-CSCF to control a function within the GGSN. The architecture for QoS management defined by 3GPP (recommendation 23.207) is illustrated in FIG. 4. As shown in this Figure, the GGSN (Gateway Node) communicates with a Policy Control Function (PCF) function which can be co-located with the P-CSCF. This interface between the GGSN and the PCF function within the PCSCF is specified as the Go interface. The Go interface is based on the COPS protocol.

It is noted that although the PCF element may be located external to the P-CSCF, the 3GPP standard allows for it to be co-located with the P-CSCF, and the protocols must therefore support operation in this configuration.

BRIEF SUMMARY OF THE INVENTION

Summary of the Invention In practice, a GGSN may and probably will support multiple P-CSCFs for the sessions in which UEs connected to the GGSN are involved. As PCFs are co-located with respective P-CSCFs, the GGSN must be able to work with multiple PCF nodes.

Applying the COPS-PR architecture, the GGSN is the PEP node and the PCF is the PDP node. However, the COPs architecture requires that the PEP node works with only a single PCP node for each client type. This problem applies also to other network architectures requiring a plurality of PDP nodes to communicate decisions to a single common PEP node.

According to a first aspect of the invention there is provided a method of notifying a first policy enforcement point node of policies and/or policy decisions made at a plurality of second policy decision point nodes, the first and second nodes being arranged to communicate with one another via an IP network using the Common Open Policy Service, COPS, protocol, the method comprising: establishing a single COPS connection between the first node and a third coordination network node also coupled to the IP network; establishing a COPS connection between the third network node and each of the second network nodes; sending decisions from the second network nodes to the third network node over the respective COPS connections and, at the third network node, recording the sources of the decisions and forwarding the decisions to the first network node over the COPS connection; and sending responses to decisions from the first network node to the third network node over COPS connection and, at the third network node, identifying the source second nodes of the decisions based upon the recorded sources and forwarding the responses to the respective second nodes over the respective COPS connections.

According to a second aspect of the present invention there is provided a method of notifying a first policy enforcement point node of policies and/or policy decisions made at a plurality of second policy decision point nodes, the first and second nodes communicating with one another via an IP network using the Common Open Policy Service, COPS, protocol, the method comprising: at said first node, establishing a virtual policy enforcement point for each second node: establishing a COPS connection between each of the virtual policy enforcement points and the second node; and sending decisions and decision responses between the virtual policy enforcement points and the second node over the respective COPS connections.

Embodiments of the present invention enable decisions to be communicated from multiple PDP nodes to a single PEP without a conflict resulting at the PEP. Responses may also be sent from the PEP to the correct PDPs, i. e. to the PDPs at which the corresponding decisions originated.

Preferably, said first policy enforcement point node is a GGSN of a data network within a mobile telecommunications network, e. g. a 3GPP network, and said second policy decision point nodes are P-CSCF nodes of an IP Multimedia Core Network Subsystem (IMS), the P-CSCF nodes implementing a Policy Control Function for the GGSN.

According to a third aspect of the present invention there is a method of enabling a first policy enforcement point node to be notified of policies and/or policy decisions made at a plurality of second policy decision point nodes, the first and second nodes being arranged to communicate with one another via an IP network using the Common Open Policy Service, COPS, protocol, the method comprising, at a third network node coupled to the IP network: establishing a single COPS connection to the first node; establishing a COPS connection with each of the second network nodes; receiving decisions from the second network nodes over the respective COPS connections, recording the sources of the decisions, and forwarding the decisions to the first network node over the COPS connection; and receiving responses to decisions from the first network node over the COPS connection, identifying the source second nodes of the decisions based upon the recorded sources, and forwarding the responses to the respective second nodes over respective COPS connections.

According to a fourth aspect of the present invention there is provided a method of operating a Gateway Support Node of a packet switched network of a mobile telecommunications network, which Node is coupled to a plurality of policy decision points via an IP network, the method comprising: implementing a plurality of virtual Gateway Support Node functions which are mapped to policy decision points based upon the identities of users of the packet switched network.

According to a fifth aspect of the present invention there is provided apparatus for enabling a first policy enforcement point node to be notified of policies and/or policy decisions made at a plurality of second policy decision point nodes, the first and second nodes being arranged to communicate with one another via an IP network using the Common Open Policy Service, COPS, protocol, the apparatus comprising: input output means coupled to the IP network; a first processor means coupled to the input output means and being arranged to establish a single COPS connection the first node; a second processor means coupled to the input output means and being arranged to establish a COPS connection with each of the second network nodes; a third processor means coupled to the input output means and being arranged to receive decisions from the second network nodes over the respective COPS connections, recording the sources of the decisions, and forwarding the decisions to the first network node over the COPS connection; and a fourth processor means coupled to the input output means and being arranged to receive responses to decisions from the first network node over the COPS connection, identifying the source second nodes of the decisions based upon the recorded sources, and forwarding the responses to the respective second nodes over respective COPS connections.

According to a sixth aspect of the present invention there is provided a Gateway Support Node for use in a packet switched network of a mobile telecommunications network, the Node comprising: first input/output means for coupling to said packet switched network; second input/output means for coupling to an IP network to which a plurality of policy decision points may be coupled; and one or more processors coupled to the first and second input/output means for implementing a plurality of virtual Gateway Support Node functions which are mapped to policy decision points based upon the identities of users of the packet switched network.

Preferably, the Gateway Support Node is a GPRS Gateway Support Node for use in providing a GPRS packet switched service.

DETAILED DESCRIPTION OF A PREFERRED EMBODIMENT

As has been explained above, support for IMS capabilities in future telecommunications networks will require the Go interface (between the Gateway GGSN and the PCF of the P-CSCF as shown in FIG. 4) to support certain charging models. The basic architectural incompatibility between the current 3GPP architecture for the Go interface and the IETF COPS architecture must be overcome. Two embodiments will now be described which allow this to be achieved.

Embodiment 1

Figure 5:
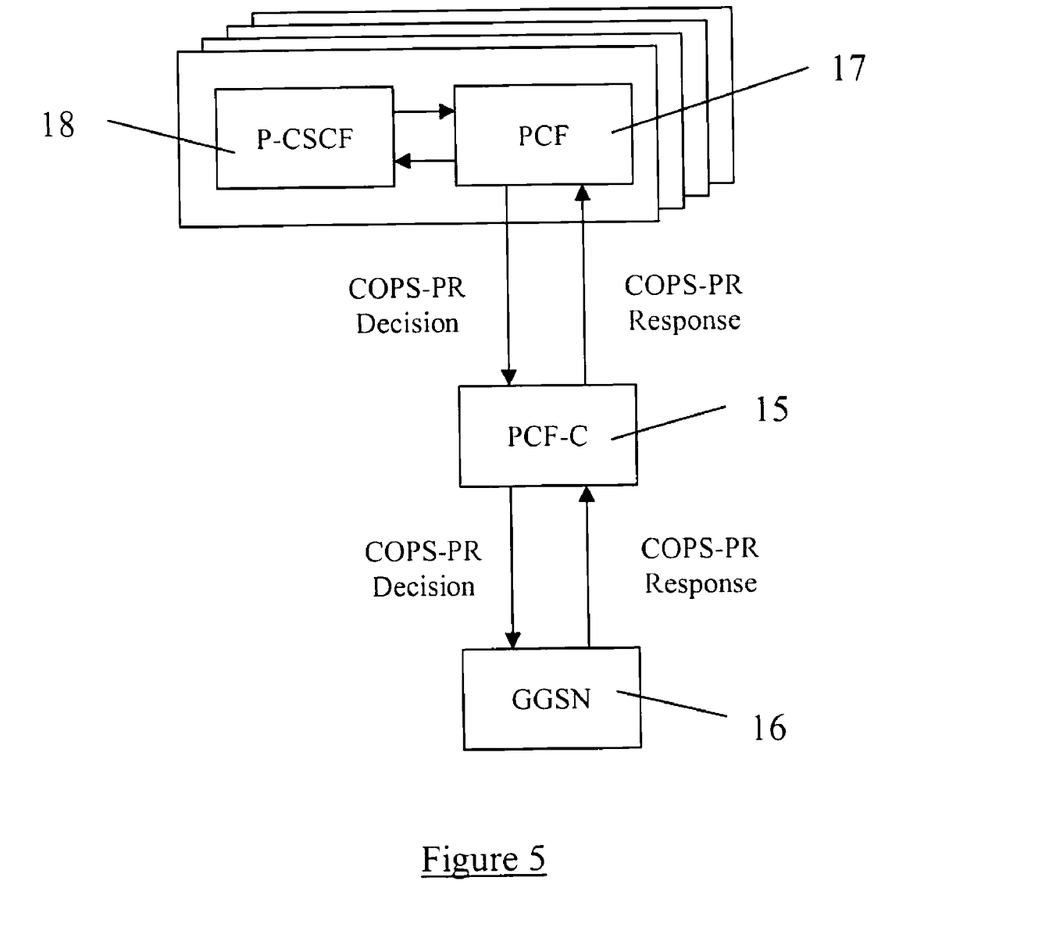
FIG. 5 illustrates schematically an architecture according to a first embodiment of the invention for allowing a single GGSN to communicate with multiple Policy Control Functions at respective P-CSCFs.

The first embodiment is to introduce a Policy Control Function Co-ordinator (PCF-C) node 15 into the 3GPP architecture. This node appears towards the GGSN 16 as the PDP node for the Service Based Local Policy (SBLP) client type, thus satisfying the COPS requirement that for a given client type a PEP can work towards only a single PDP. The PCF-C co-ordinates the COPS-PR decisions/responses for one GGSN to/from multiple PCF elements 17 co-located with respective P-CSCF nodes 18. This is illustrated in FIG. 5.

Figure 6:
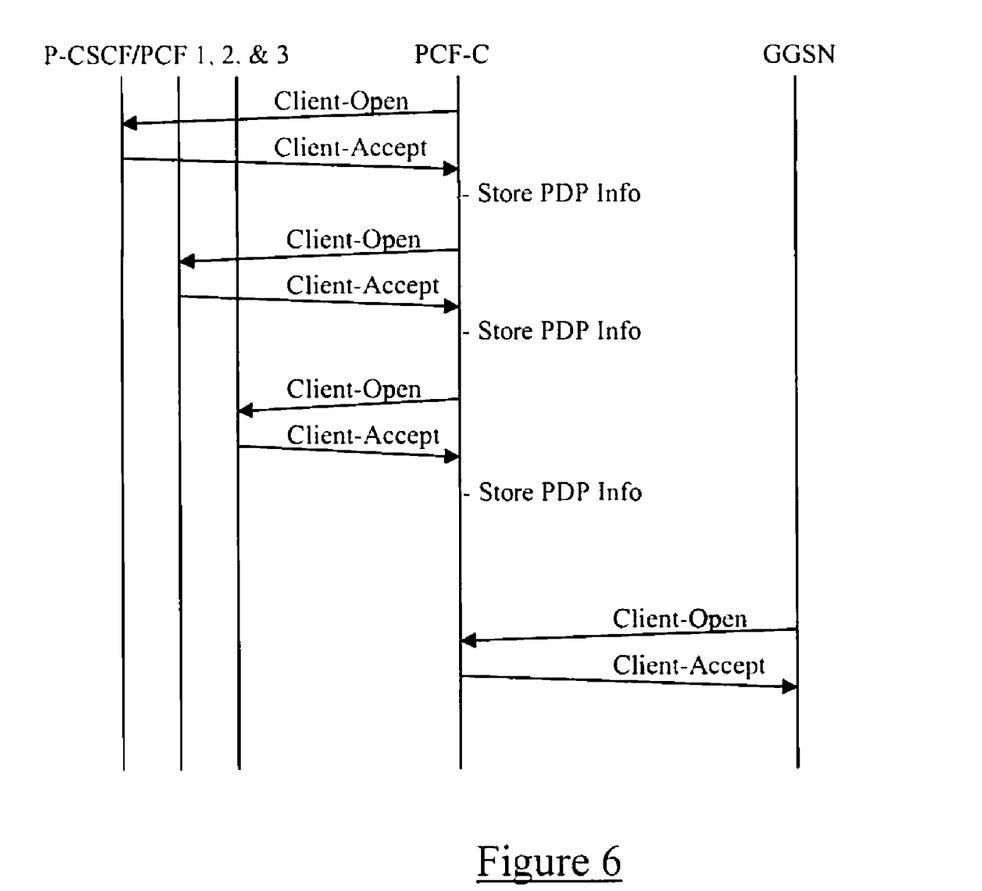
FIG. 6 shows signalling in the architecture of FIG. 5, associated with the opening of COPS connections.

Each GGSN 16 establishes a COPS connection to one PCF-C 15 for the SBLP client type, as per the COPS-PR specification. The PCF-C 15 then opens a connection to each PCF 17 that the GGSN 16 may work towards (this could include all P-CSCF/PCF nodes within the network) as shown in FIG. 6. The PCF nodes 17 then use this connection to install policies in the GGSN 16.

The PCFs 17 generate SBLP decisions for the GGSN 16, and these are transmitted via COPS-PR to the PCF-C 15, which appears as the GGSN 16 to the PCFs 17. When the PCF-C 15 receives a SBLP decision from a PCFs 17, the PCF-C 15 records information about the source of the decision. A "Handle Object" encapsulates a unique value that identifies an installed state. This identification is used by most COPS operations. The handle is unique from other client handles from the same PEP (i.e. other COPS TCP connections) for a particular client-type. The PCF-C 15 shall create a local unique handle for each unique handle received from the multiple PCFs. The Handle Object is updated with the unique handle created in the PCF-C 15. The TCP and IP headers are set (i.e. modified including changing the source and destination IP addresses) according to the normal rules for the TCP connection, and the modified COPS packet is transmitted down the open TCP connection to the GGSN 16.

Figure 7:
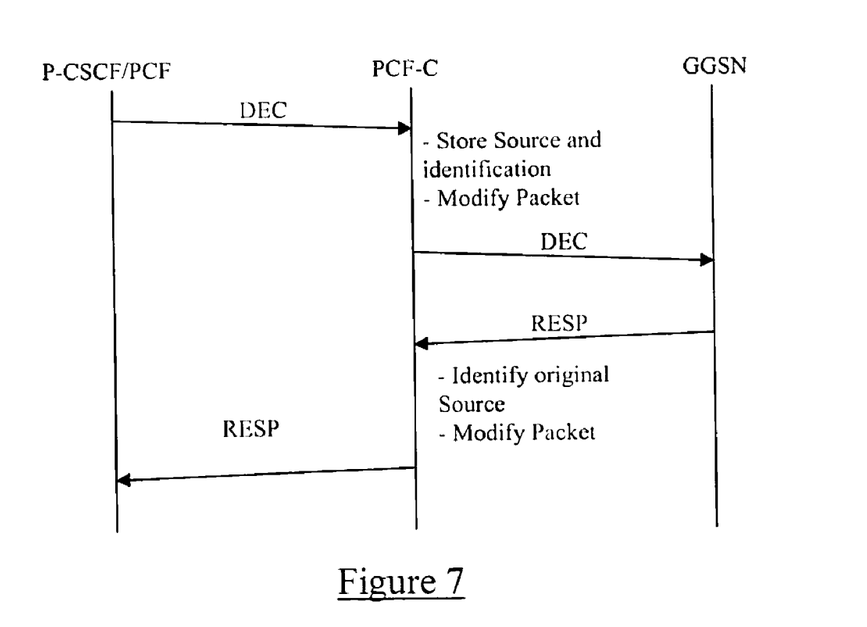
FIG. 7 shows decision and response signalling over the COPS connections established with the signalling of FIG. 6.

When the PCF-C 15 receives a response from the GGSN 16, the COPS packet is extracted and a reverse lookup of the request used to ascertain which PCF 17 the request originated from, i.e. a mapping is made between the COPS Handle Object (allocated by the PCF-C 15) and the handle supplied from the PCF 17. The COPS packet is modified to replace the PCF-C defined COPS Handle Object with the handle supplied by the PCF. The PCF-C 15 also adapts the TCP and IP headers, and forwards the response to the originating PCF 17 over the open TCP connection.

Embodiment 2

Figure 8:
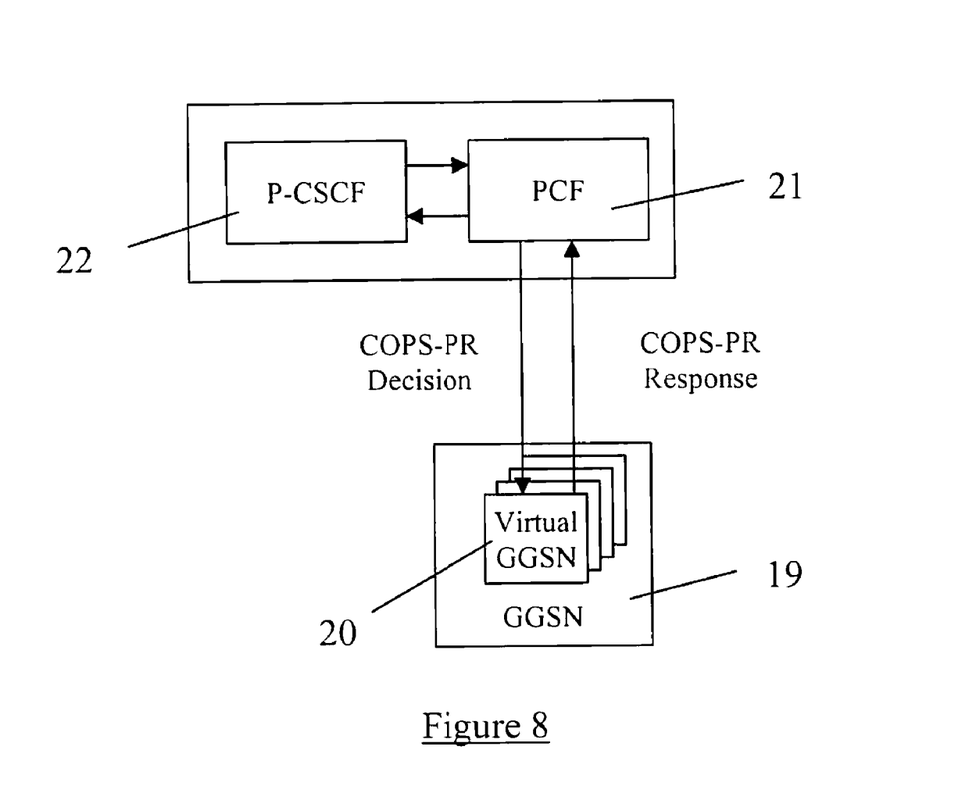
FIG. 8 illustrates schematically an architecture according to a second embodiment of the invention for allowing a single GGSN to communicate with multiple Policy Control Functions at respective P-CSCFs.

An alternative embodiment is to create a set of "logical GGSN nodes" within the one physical GGSN node. Each logical node can of course work towards a separate PCSCF/PCF, as shown below in FIG. 8. Here, a single GGSN 19 consists of a number of logical or virtual GGSN nodes 20. Each logical node may communicate with a separate P-CSCF/PCF 21 which is co-located with a P-CSCF node 22. The virtual GGSN connections could be separated either through allocating a set of IP addresses, or by using different ports.

Figure 9:
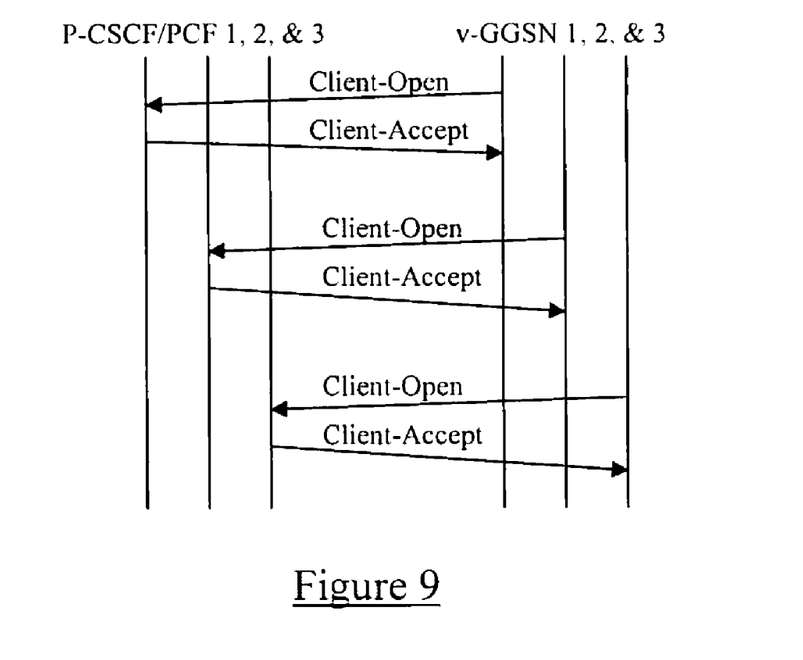
FIG. 9 shows signalling in the architecture of FIG. 8, associated with the opening of COPS connections.

When a node is initialised, the connection to the one PDP would normally be established. In this case, when the GGSN 19 is initialised, each virtual GGSN or vGGSN 20 would establish the connection to the associated PCF 21 as shown in FIG. 9. The implementation may either only create thev-GGSN 20 when the users are actually connected and the PCF they are working towards is identified, or they may all be created a priori and the users allocated to the pre-existing-GGSN 20 when they are connected. When a user attaches to the IMS APN through the GGSN 19, an IP address is allocated to that user, and the P-CSCF/PCF for that user is identified. At this time, the IP address for the user is allocated to the virtual GGSN 20 associated to that PCF 21. As long as that IP address remains allocated, the virtual GGSN 20 is able to receive SBLP policies from that PCF 21 for that user's IP address. When the user disconnects from the APN (i. e. the PDP context is removed), then the virtual GGSN 20 shall remove that IP address from its list of IP addresses identified as being under the control of the PCF.

The virtual GGSN 20 shall reject any decisions it receives for an IP address which is not owned by that virtual GGSN 20.

Figure 10:
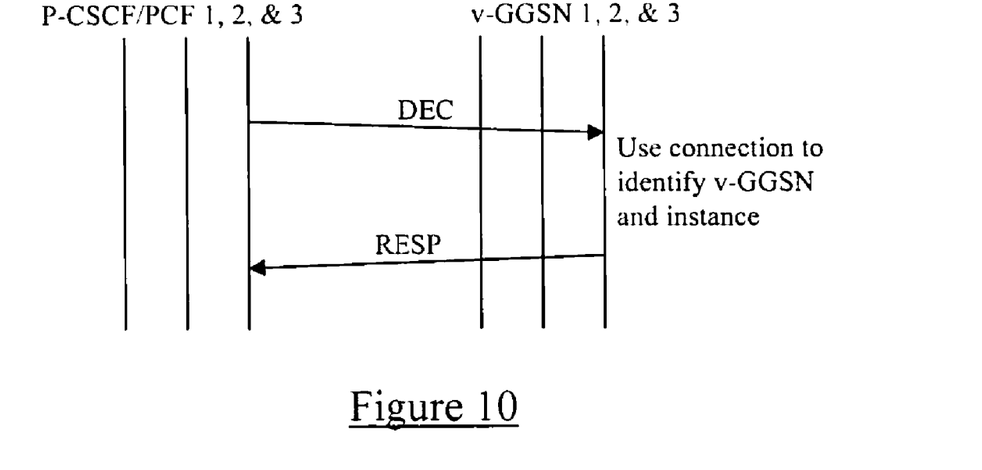
FIG. 10 shows decision and response signalling over the COPS connections established with the signalling of FIG. 9.

Thev-GGSN 20 shall then receive decisions and send reports over the open COPS interface as per a normal COPS client as shown in FIG. 10. With thev-GGSN logical node 20 inside the GGSN 19, there is no overlap for policy control from multiple PCSCF/PCF devices towards a single GGSN for the SBLP client type.

The second embodiment considered here has a potential advantage in that it does not require standardisation. Thus, if the 3GPP architecture is not specifically modified to introduce a PCF-C node (embodiment 1), then the implementation of a "virtual" GGSN will overcome the problem outlined.

It will be appreciated by the person of skill in the art that various modifications may be made to the above described embodiments without departing from the scope of the present invention. For example, whilst the invention has been illustrated with reference to the current COPS protocol, the invention may also be applied to current and future versions of that protocol.

What is claimed is:

1. In a mobile telecommunications network a method of notifying a first policy enforcement point (PEP) node of policies and/or policy decisions made at a plurality of policy decision point (PDP) nodes, the PEP and the PDP nodes adapted to communicate with one another via an IP network using the Common Open Policy Service (COPS) protocol, the method comprising:

establishing a single COPS connection between the PEP node and a coordination node also coupled to the IP network;

establishing a COPS connection between the coordination node and each of the PDP nodes;

sending decisions from the PDP nodes to the coordination node over the respective COPS connections and, at the coordination node, recording the sources of the decisions and forwarding the decisions to the PEP node over the COPS connection; and sending responses to decisions from the PEP node to the coordinating node over the single COPS connection and, at the coordinating node, identifying the source PDP nodes of the decisions based upon the recorded sources and forwarding the responses to the respective PDP nodes over the respective COPS connections.

2. The method of claim 1, wherein said third network node records the identity of the originating second network node for each decision received by it and routes responses received from the first network node according to the recorded information.

3. The method of claim 1, wherein the PEP node is a Gateway General Packet Radio Service Support Node, GGSN, of a data network within the mobile telecommunications network and the PDP nodes are Proxy-Call State Control Function (P-CSCF) nodes of an IP Multimedia Core Network Subsystem (IMS) the P-CSCF nodes implementing a Policy Control Function for the GGSN.

4. In a mobile telecommunications network, a method of enabling a policy enforcement point (PEP) node to be notified of policies and/or policy decisions made at a plurality of policy decision point (PDP) nodes, the PEP and the PDP nodes adapted to communicate with one another via an IP network using the Common Open Policy Service (COPS) protocol, the method comprising, at a coordinating node coupled to the IP network:
establishing a single COPS connection to the PEP node;
establishing a COPS connection with each of the PDP nodes;
receiving decisions from the PDP nodes over the respective COPS connections, recording the sources of the decisions, and forwarding the decisions to the PEP node over the COPS connection; and
receiving responses to decisions from the PEP node over the COPS connection, identifying the source PDP nodes of the decisions based upon the recorded sources, and forwarding the responses to the respective PDP nodes over respective COPS connections.

5. The method of claim 4, wherein said coordinating node records the identity of the originating PDP node for each decision received and routes responses received from PEP node according to the recorded information.

6. The method of claim 4, wherein said PEP node is a Gateway General Packet Radio Service Support Node (GGSN) of a data network within a mobile telecommunications network and said PDP nodes are Proxy-Call State Control Function (P-CSCF) nodes of an IP Multimedia Core Network Subsystem (IMS), the P-CSCF nodes implementing a Policy Control Function for the GGSN.

7. In a mobile telecommunications network, an apparatus for enabling a policy enforcement point node to be notified of policies and/or policy decisions made at a plurality of second policy decision point nodes, the PEP and the PDP nodes adapted to communicate with one another via an IP network using the Common Open Policy Service, COPS, protocol, the apparatus comprising:

input output means coupled to the IP network;
a first processor means coupled to the input output means adapted to establish a single COPS connection the PEP node;
a second processor means coupled to the input output means adapted to establish a COPS connection with each of the PDP nodes;
a third processor means coupled to the input output means adapted to receive decisions from the PDP nodes over the respective COPS connections, recording the sources of the decisions, and forwarding the decisions to the PEP node over the COPS connection; and a fourth processor means coupled to the input output means and adapted to receive responses to decisions from the PEP node over the COPS connection, identifying the source PDP nodes of the decisions based upon the recorded sources, and forwarding the responses to the respective PDP nodes over respective COPS connections.

8. The apparatus of claim 7, wherein the apparatus is a General Packet Radio Service Gateway Support Node (GGSN) for use in providing a General Packet Radio Service (GPRS) packet switched service.

9. A coordinating node in a network for enabling a policy enforcement point (PEP) node to be notified of policies and/or policy decisions made at a plurality of policy decision point (PDP) nodes, the PEP and the PDP nodes communicating with one another via an IP network using the Common Open Policy Service (COPS) protocol, the coordinating node comprising:
means for establishing a single COPS connection to the PEP node;
mean for establishing a COPS connection with each of the PDP nodes;
means for receiving decisions from the PDP nodes over the respective COPS connections, recording the sources of the decisions, and forwarding the decisions to the PDP node over the COPS connection; and
means for receiving responses to decisions from the PEP node over the COPS connection, identifying the source second nodes of the decisions based upon the recorded sources, and forwarding the responses to the respective PDP nodes over respective COPS connections.

10. The method of claim 9, wherein said coordinating node records the identity of the originating PDP node for each decision received and routes responses received from the PEP node according to the recorded information.

11. The method of claim 9, wherein said PEP node is a Gateway General Packet Radio Service Support Node (GGSN) of a data network within a mobile telecommunications network and said PDP nodes are Proxy-Call State Control Function (P-CSCF) nodes of an IP Multimedia Core Network Subsystem, (IMS) the P-CSCF nodes implementing a Policy Control Function for the GGSN.

12. A system in a mobile telecommunications network, the system comprising:
a policy enforcement point (PEP) node;
a plurality of policy decision point (PDP) nodes, the PEP and the plurality of PDP nodes adapted to communicate with one another via an IP network using the Common Open Policy Service (COPS) protocol;
means for establishing a single COPS connection between the PEP node and a coordination network node coupled to the IP network;
means for establishing a COPS connection between the co-ordination network node and each of the PDP network nodes;
means for sending decisions from the PDP network nodes to the coordination network node over the respective COPS connections and, at the coordination network node, recording the sources of the decisions and forwarding the decisions to the PEP network node over the COPS connection; and
sending responses to decisions from the PEP network node to the coordination network node over the single COPS connection and, at the coordination network node, identifying the source PDP nodes of the decisions based upon the recorded sources and forwarding the responses to the respective PDP nodes over the respective COPS connections.

13. The method of claim 12, wherein the coordination node records, the identity of the originating PDP node for each decision received and routes responses received from the PEP node according to the recorded information.

14. The method of claim 12, wherein said PEP node is a Gateway General Packet Radio Service Support Node, GGSN, of a data network within the mobile telecommunications network and said PDP nodes are Proxy-Call State Control Function (P-CSCF) nodes of an IP Multimedia Core Network Subsystem (IMS) the P-CSCF nodes implementing a Policy Control Function for the GGSN.

* * * * *

UNITED STATES PATENT AND TRADEMARK OFFICE
CERTIFICATE OF CORRECTION

PATENT NO.      : 8,195,811 B2                                    Page 1 of 1
APPLICATION NO. : 11/761115
DATED           : June 5, 2012
INVENTOR(S)     : Williams et al.

It is certified that error appears in the above-identified patent and that said Letters Patent is hereby corrected as shown below:

In the Specification

Column 2, Line 50, delete "3,8." and insert -- 3,8, --, therefor.

Column 4, Line 33, delete "node:" and insert -- node; --, therefor.

In the Claims

Column 10, Line 1, in Claim 11, delete "Network Subsystem, (IMS)" and insert -- Network Subsystem (IMS), --, therefor.

Column 10, Line 29, in Claim 13, delete "method" and insert -- system --, therefor.

Column 10, Line 30, in Claim 13, delete "records," and insert -- records --, therefor.

Column 10, Line 33, in Claim 14, delete "method" and insert -- system --, therefor.

Signed and Sealed this
Eleventh Day of February, 2014

Michelle K. Lee
*Deputy Director of the United States Patent and Trademark Office*